(12) United States Patent
Xie et al.

(10) Patent No.: US 9,970,810 B2
(45) Date of Patent: May 15, 2018

(54) WEIGHING SYSTEM AND WEIGHING METHOD HAVING WEIGHING UNINTERRUPTED FUNCTIONS

(71) Applicants: Mettler Toledo (Changzhou) Precision Instrument Ltd., Jiangsu (CN); Mettler Toledo (Changzhou) Measurement Technology Ltd., Jiangsu (CN); Mettler Toledo (Changzhou) Scale & System Ltd., Jiangsu (CN)

(72) Inventors: Guojun Xie, Jiangsu (CN); Zijian Zhu, Jiangsu (CN); Qi Wan, Jiangsu (CN)

(73) Assignees: METTLER TOLEDO (CHANGZHOU) PRECISION INSTRUMENT LTD., Changzhou, Jiangsu (CN); METTLER TOLEDO (CHANGZHOU) SCALE & SYSTEM LTD., Changzhou, Jiangsu (CN)

( * ) Notice: Subject to any disclaimer, the term of this patent is extended or adjusted under 35 U.S.C. 154(b) by 323 days.

(21) Appl. No.: 14/729,284

(22) Filed: Jun. 3, 2015

(65) Prior Publication Data

US 2015/0268089 A1  Sep. 24, 2015

Related U.S. Application Data

(63) Continuation of application No. PCT/CN2013/088505, filed on Dec. 4, 2013.

(30) Foreign Application Priority Data

Dec. 4, 2012 (CN) .......................... 2012 1 0513928

(51) Int. Cl.
*G01G 23/01* (2006.01)
*G01G 23/37* (2006.01)
*G01G 23/00* (2006.01)

(52) U.S. Cl.
CPC ............. *G01G 23/01* (2013.01); *G01G 23/00* (2013.01); *G01G 23/37* (2013.01); *G01G 23/3735* (2013.01)

(58) Field of Classification Search
CPC ........ G01G 23/00; G01G 23/01; G01G 23/37; G01G 23/3735
See application file for complete search history.

(56) References Cited

U.S. PATENT DOCUMENTS

| 4,459,028 A | * | 7/1984 | Bruder | .................... B01F 5/241 141/83 |
| 4,691,290 A | * | 9/1987 | Griffen | ................ G01G 3/1414 177/25.13 |

(Continued)

FOREIGN PATENT DOCUMENTS

| CN | 1601239 A | 3/2005 |
| CN | 101160512 A | 4/2008 |

(Continued)

OTHER PUBLICATIONS

Computer Translation of JP 2002-071434 from the JPO webpage, Jun. 15, 2017.*

(Continued)

*Primary Examiner* — Randy Gibson
(74) *Attorney, Agent, or Firm* — Buchanan Ingersoll & Rooney PC (57) ABSTRACT

A weighing system and a weighing method are disclosed having uninterrupted weighing functions. A plurality of load cells in the weighing system are arranged so that each load cell has a local small neighborhood, the local small neighborhood being defined by four neighboring points in front, back, left, and right of the load cell and four points on diagonal directions in a matrix. A weighing control module polls the load cells to determine whether there is failed load cell(s), and performs a calculation:

(Continued)

$W_i = f(W_1, W_2, W_3, W_4, W_5, W_6, W_7)$, where f is a non-linear mapping; and
$W_1 \ldots W_8$ represents weighing outputs of load cells corresponding to the eight points in the local small neighborhood so as to calculate an estimated weighing output of the failed load cell.

18 Claims, 5 Drawing Sheets

(56) References Cited

U.S. PATENT DOCUMENTS

| | | | | |
|---|---|---|---|---|
| 4,804,052 | A * | 2/1989 | Griffen | G01G 23/3714 177/25.14 |
| 4,909,338 | A * | 3/1990 | Vitunic | G01G 23/01 177/25.14 |
| 5,143,165 | A * | 9/1992 | Hough | G01G 13/18 141/83 |
| 5,148,943 | A * | 9/1992 | Moller | B29C 47/0874 177/50 |
| 5,753,868 | A * | 5/1998 | Diem | G01G 19/343 177/1 |
| 5,805,467 | A | 9/1998 | Richards | |
| 6,112,162 | A | 8/2000 | Richards | |
| 6,576,849 | B2 * | 6/2003 | Bliss | G01G 23/01 177/199 |
| 6,636,820 | B2 * | 10/2003 | Livingston | G01G 23/01 453/32 |
| 6,911,607 | B2 * | 6/2005 | Klijn | B01F 5/26 177/116 |
| 7,677,113 | B2 | 3/2010 | Laubstein et al. | |
| 8,674,241 | B2 * | 3/2014 | Klauer | G01G 15/00 177/1 |
| 9,587,974 | B2 * | 3/2017 | Wechselberger | |
| 2008/0087103 | A1 | 4/2008 | Laubstein et al. | |
| 2017/0176242 | A1 * | 6/2017 | Wechselberger | G01G 23/3735 |

FOREIGN PATENT DOCUMENTS

| | | |
|---|---|---|
| JP | 2002071434 A | 3/2002 |
| JP | 2004-226304 A | 8/2004 |
| JP | 2009-053211 A | 3/2009 |

OTHER PUBLICATIONS

"Solving Systems of Linear Equations Using Matrices" from the "Math's Fun, Advanced" webpage (https://www.mathsisfun.com/algebra/systems-linear-equations-matrices.html) downloaded Jun. 16, 2017.*

The extended European Search Report dated Sep. 13, 2016, by the European Patent Office in corresponding European Application No. 13859696.0. (8 pages).

International Search Report (PCT/ISA/210) dated Mar. 13, 2014, by the Chinese Patent Office as the International Searching Authority for International Application No. PCT/CN2013/088505.

* cited by examiner

WEIGHING SYSTEM AND WEIGHING METHOD HAVING WEIGHING UNINTERRUPTED FUNCTIONS

RELATED APPLICATIONS

This application claims priority as a continuation application under 35 U.S.C. § 120 to PCT/CN2013/088505, which was filed as an International Application on Dec. 4, 2013 designating the U.S., and which claims priority to Chinese Application 201210513928.0 filed in China on Dec. 4, 2012. The entire contents of these applications are hereby incorporated by reference in their entireties.

FIELD

The present disclosure relates to a weighing system and a weighing method, wherein the weighing system includes a plurality of load cells, a weighing platform or carrier, a communication cable, a weighing display, and a terminal controller.

BACKGROUND INFORMATION

In various weighing applications, objects may not be accurately weighed due to failure of a weighing system so that the normal production and work are affected and different degrees of economic losses are caused to customers. Among various failures of the weighing system, damage and failure of a load cell or similar faults can regularly occur.

In a weighing system having a plurality of analog load cells, all the analog signals are synthesized together to form a combined analog signal for output to a weighing instrument. Under such a situation, when one or more load cells fail, the weighing system still outputs weighing readings so that the operators may not timely realize that one or more load cells have failed and continue weighing operations until the failure has been detected by an inspection department or after a long time.

In a weighing system having a plurality of digital load cells, when one or more load cells fail, the weighing system still outputs weighing readings which are no longer accurate weighing data. If the failure has been timely discovered, the load cells are repaired or replaced, and the weighing operation is stopped until all the failures have been addressed. The forced suspension of weighing operations and related operations may cause different degrees of waste of time, resources, and human effort. If the failure alarm has not been timely discovered and the weighing operation continues, the weighing operation under such situation is inaccurate, which may result in extra or even severe economical loss and reputation loss which the users can not afford.

SUMMARY

A weighing method is disclosed for providing a combined weighing value with a weighing system having uninterrupted weighing functions, the weighing system having a plurality of load cells, the weighing method comprising: a) arranging the plurality of load cells so that each load cell has a local small neighborhood, the local small neighborhood being a neighborhood defined by four neighboring points in front, back, left, and right of the load cell and four points on the diagonal directions in a matrix, the local small neighborhood of each load cell having other load cells disposed on at least some points; b) determining whether there is failed load cell(s), and if there is no failed load cell, then a combined weighing value of weighing system is determined according to the weighing outputs of all the load cells; or if there is failed load cell(s), then a calculation is performed as follows:

$$W_* = f(W_1, W_2, \ldots W_m) = [k_1, k_2, \ldots k_m] \times \begin{bmatrix} W_1 \\ W_2 \\ \vdots \\ W_m \end{bmatrix} +$$

$$\ldots + [W_1, W_2, \ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix}$$

where,
m is a number of normal load cells in the local small neighborhood of the failed load cell;
$W_1, W_2, \ldots W_m$ are weighing outputs of the normal load cells in the local small neighborhood;
$W_*$ is an estimated output weighing value of the failed load cell;
$k_1, k_2, \ldots k_m$ are linear estimation coefficients;
$q_{11}(n), q_{12}(n), \ldots q_{mm}(n)$ are nth non-linear estimation coefficients, n being an integer greater than or equal to 2;
the linear estimation coefficients and the nth non-linear estimation coefficients being determined by substituting experimental data derived by at least $m+(n-1)m^2$ times of weighing into an equation as follows under a circumstance that all the load cells work normally:

$$[k_1, k_2, \ldots k_m] \times \begin{bmatrix} W_1 \\ W_2 \\ \vdots \\ W_m \end{bmatrix} + \ldots + [W_1, W_2,$$

$$\ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix} - W_* = 0$$

where, $W_*$ is a weighing output of the failed load cell when the failed load cell works normally;
c) providing the combined weighing value of the whole weighing system equal to the weighing outputs of all the normal load cells and the estimated weighing outputs of all the failed load cells as follows:

$$W = \sum_{i=1}^{m^*} W_i + \sum_{j=0}^{p} W_{*j}$$

where,
W is a combined weighing value of the weighing system;
$W_i$ is the weighing output of each normal load cell;
$W_{*j}$ is the estimated weighing value of each failed load cell;
m* is the total number of normal load cells and is an integer, and m*≥1;
p is a total number of failed load cells and is an integer, and p≥0.

A weighing system is also disclosed having uninterrupted weighing functions for providing a combined weighing value, wherein the weighing system comprises: a plurality of load cells; a weighing platform or carrier; and a weighing control module, the weighing control module being coupled to the plurality of load cells, where the plurality of load cells are arranged so that each load cell has a local small neighborhood, the local small neighborhood being a neighborhood defined by four neighboring points in front, back, left, and right of the load cell and four points on diagonal directions in a matrix, the local small neighborhood of each load cell having other load cells disposed on at least some points; the weighing control module being configured to poll the plurality of load cells to determine whether there is failed load cell(s), and if there is failed load cell(s), then the weighing control module is configured to perform a calculation as follows:

$$W. = f(W_1, W_2, \ldots W_m) = [k_1, k_2, \ldots k_m] \times \begin{bmatrix} W_1 \\ W_2 \\ \vdots \\ W_m \end{bmatrix} +$$

$$\ldots + [W_1, W_2, \ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix}$$

where, m is a number of normal load cells in the local small neighborhood of the failed load cell;

$W_1, W_2, \ldots W_m$ are weighing outputs of the normal load cells in the local small neighborhood;

W. is an estimated output weighing value of the failed load cell;

$k_1, k_2, \ldots k_m$ are linear estimation coefficients;

$q_{11}(n), q_{12}(n), \ldots q_{mm}(n)$ are nth non-linear estimation coefficients, n being an integer greater than or equal to 2;

the linear estimation coefficients and the nth non-linear estimation coefficients being determined by substituting experimental data derived by at least $m+(n-1)m^2$ times of weighing into an equation as follows under a circumstance that all the load cells work normally:

$$[k_1, k_2, \ldots k_m] \times \begin{bmatrix} W_1 \\ W_2 \\ \vdots \\ W_m \end{bmatrix} + \ldots + [W_1, W_2,$$

$$\ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix} - W_* = 0$$

where, $W_*$ is a weighing output of the failed load cell when the failed load cell works normally;

a combined weighing value of the whole weighing system being equal to weighing outputs of all the normal load cells and the estimated weighing outputs of all the failed load cells and is expressed below:

$$W = \sum_{i=1}^{m^*} W_i + \sum_{j=0}^{p} W_{\cdot j}$$

where,

W is a combined weighing value of the weighing system;

$W_i$ is the weighing output of each normal load cell;

$W_{\cdot j}$ is the estimated weighing value of each failed load cell;

m* is a total number of normal load cells and is an integer, and m*≥1; and p is a total number of failed load cells and is an integer, and p≥0.

BRIEF DESCRIPTION OF THE DRAWINGS

Other features and advantages of the present disclosure will be appreciated by a reading of the description of exemplary embodiments in conjunction with the attached drawings, wherein.

DETAILED DESCRIPTION

A weighing system and a weighing method are disclosed which have uninterrupted weighing functions so as to avoid waste of time, resources, and human effort under circumstances where failed load cells are not timely replaced or cannot be replaced during weighing operation.

A weighing method is disclosed for use in a weighing system having uninterrupted weighing functions, wherein the weighing system includes a plurality of load cells, and the weighing method includes:

a) arranging a plurality of load cells so that each load cell has a local small neighborhood, the local small neighborhood being a neighborhood defined by four neighboring points in front, back, left, and right of the load cell and four points on the diagonal directions in a matrix, wherein the local small neighborhood of each load cell has other load cells disposed on at least some points;

b) determining whether there is failed load cell(s), and if there is no failed load cell, then a combined weighing value of the weighing system is determined according to the weighing outputs of all the load cells; or if there is failed load cell(s), then performing a calculation as follows:

$$W. = f(W_1, W_2, \ldots W_m) = [k_1, k_2, \ldots k_m] \times \begin{bmatrix} W_1 \\ W_2 \\ \vdots \\ W_m \end{bmatrix} +$$

$$\ldots + [W_1, W_2, \ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix}$$

where,
m is a number of normal load cells in a local small neighborhood of the failed load cell;
$W_1, W_2, \ldots W_m$ are weighing outputs of the normal load cells in the local small neighborhood;
W. is an estimated output weighing value of the failed load cell;
$k_1, k_2, \ldots k_m$ are linear estimation coefficients;
$q_{11}(n), q_{12}(n), \ldots q_{mm}(n)$ are nth non-linear estimation coefficients, n being an integer greater than or equal to 2;
wherein the linear estimation coefficients and the nth non-linear estimation coefficients are determined by substituting experimental data derived by at least $m+(n-1)m^2$ times of weighing into an equation as follows under s circumstance that all the load cells work normally with the following steps:

$$[k_1, k_2, \ldots k_m] \times \begin{bmatrix} W_1 \\ W_2 \\ \vdots \\ W_m \end{bmatrix} + \ldots + [W_1, W_2,$$

$$\ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix} - W_* = 0$$

where, $W_*$ is the weighing output of the failed load cell when the failed load cell works normally;
c) a combined weighing value of the whole weighing system equals to weighing outputs of all the normal load cells and the estimated weighing outputs of all the failed load cells, and is expressed below:

$$W = \sum_{i=1}^{m^*} W_i + \sum_{j=0}^{p} W_{\cdot j}$$

where,
W is a combined weighing value of the weighing system;
$W_i$ is the weighing output of each normal load cell;
$W_{\cdot j}$ is the estimated weighing value of each failed load cell;
$m^*$ is the total number of normal load cells and is an integer, and $m^* \geq 1$;
p is the total number of failed load cells and is an integer, and $p \geq 0$.

A weighing system is also disclosed having uninterrupted weighing functions, the weighing system includes a plurality of load cells, a weighing platform or carrier, and a weighing control module, the weighing control module are respectively coupled to the plurality of load cells, where the plurality of load cells are arranged so that each load cell has a local small neighborhood, the local small neighborhood being a neighborhood defined by four neighboring points in front, back, left, and right of the load cell and four points on the diagonal directions in a matrix, wherein the local small neighborhood of each load cell has other load cells disposed on at least some points;
the weighing control module polls the plurality of load cells to determine whether there is failed load cell(s), and if there is failed load cell(s), then the weighing control module performs a calculation as follows:

$$W_\cdot = f(W_1, W_2, \ldots W_m) = [k_1, k_2, \ldots k_m] \times \begin{bmatrix} W_1 \\ W_2 \\ \vdots \\ W_m \end{bmatrix} +$$

$$\ldots + [W_1, W_2, \ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix}$$

where,
m is a number of normal load cells in the local small neighborhood of the failed load cell;
$W_1, W_2, \ldots W_m$ are weighing outputs of the normal load cells in the local small neighborhood;
W. is an estimated output weighing value of the failed load cell;
$k_1, k_2, \ldots k_m$ are linear estimation coefficients;
$q_{11}(n), q_{12}(n), \ldots q_{mm}(n)$ are nth non-linear estimation coefficients, n being an integer greater than or equal to 2;
where the linear estimation coefficients and the nth non-linear estimation coefficients are determined by substituting experimental data derived by at least $m+(n-1)m^2$ times of weighing into an equation as follows under a circumstance that all the load cells work normally with the following steps:

$$[k_1, k_2, \ldots k_m] \times \begin{bmatrix} W_1 \\ W_2 \\ \vdots \\ W_m \end{bmatrix} + \ldots + [W_1, W_2,$$

$$\ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mm}(n) \end{bmatrix} \times \begin{bmatrix} W_1^n \\ W_2^n \\ \vdots \\ W_m^n \end{bmatrix} - W_* = 0$$

where, $W_*$ is the weighing output of the failed load cell when the failed load cell works normally;
a combined weighing value of the whole weighing system equals to a weighing outputs of all the normal load cells and estimated weighing outputs of all the failed load cells and is expressed below:

$$W = \sum_{i=1}^{m^*} W_i + \sum_{j=0}^{p} W_{\cdot j}$$

where,
W is a combined weighing value of the weighing system;
$W_i$ is the weighing output of each normal load cell;
$W_{\cdot j}$ is the estimated weighing value of each failed load cell;

m* is the total number of normal load cells and is an integer, and m*≥1;

p is the total number of failed load cells and is an integer, and p≥0.

An exemplary weighing system implemented by the method disclosed herein includes a plurality of load cells, a weighing platform or carrier, a communication cable, a weighing display, and a terminal controller. The weighing system may or may not use a junction box. The load cells may be analog load cells or digital load cells. If the weighing system employs analog load cells, a digital junction box shall be equipped. The weighing carrier may include a single weighing platform or a plurality of weighing platforms.

Figure 1:
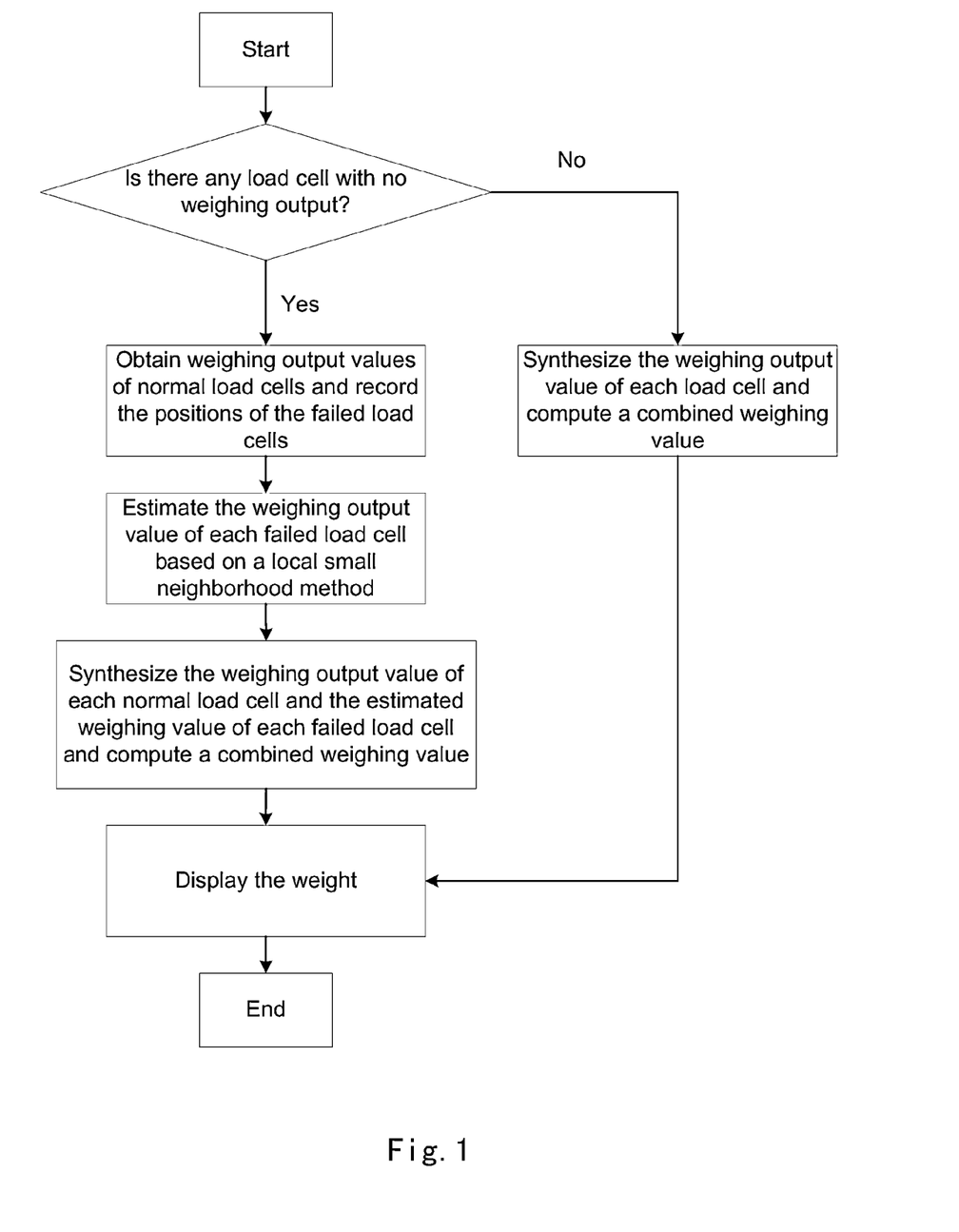
FIG. 1 illustrates a flowchart of an exemplary weighing method according to an embodiment of the present disclosure.

As shown in FIG. 1, according to an exemplary method disclosed herein, upon start of each weighing operation, it is first determined whether there is a load cell having no weighing output (i.e., the failed load cell). If there is no failed load cell, then the weighing outputs of all load cells are synthesized to compute a combined weighing output to be displayed on the weighing display. If there is failed load cell(s), then the weighing outputs of normally working load cells are obtained and the locations of the failed load cells are recorded, the weighing outputs of each failed sensor is estimated based on a local small neighborhood method that is discussed hereinafter. The weighing outputs of all normally working load cells and the estimated weighing outputs of the failed load cells are then synthesized to compute a combined weighing output to be displayed on the weighing display. In this manner, there is no additional costs for the users and no additional complexity of the structure of the scale body. This method may be applied to a situation where a plurality of load cells fail simultaneously and may be applied to various weighing applications of multiple load cells.

Figure 5:
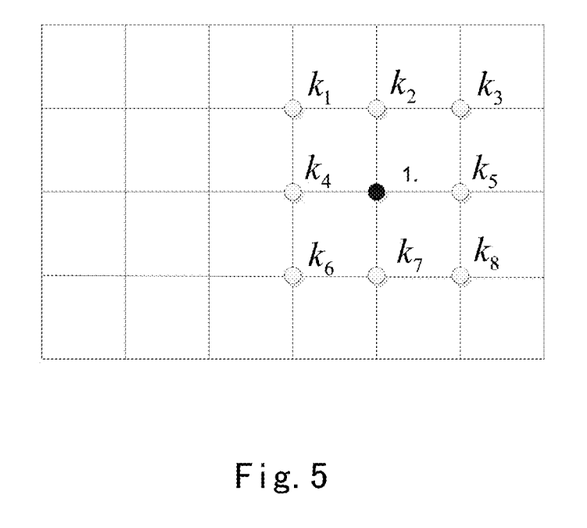
FIG. 5 illustrates a schematic view of a local small neighborhood.

In an exemplary weighing method as disclosed herein, when a load cell malfunctions or fails and no weighing data is outputted, the outputs from the load cells within its local small neighborhood (as shown in FIG. 5) may be used to estimate the output of the failed load cell. The estimated output is combined with the outputs from other load cells to form a combined output of the weighing system and is outputted on a terminal display device as a weighing result. The failed load cell refers to a load cell having no weighing signal output, which may be an analog load cell or a digital load cell.

As shown in FIG. 5, an 8-neighborhood refers to a neighborhood defined by four neighboring points in front, back, left, and right of the current load cell, and four points on the diagonal directions. In an exemplary embodiment disclosed herein, a local small neighborhood of a point is an area defined by points neighboring to the point or points with a shortest distance to the point in space, and is for example an 8-neighborhood of the point, as shown in FIG. 5. A local small neighborhood of a point may be represented as follows:

$$\begin{bmatrix} k_1 & k_2 & k_3 \\ k_4 & 1. & k_5 \\ k_6 & k_7 & k_8 \end{bmatrix}$$

where the center 1. represents a center element (i.e., the point being a processed element) $k_1 \ldots k_8$ are neighboring point values and are rational numbers. As discussed later, a local small neighborhood (i.e., an 8-neighborhood) of each load cell does not necessarily require that each load cell be in the center of a matrix and be surrounded by other 8 load cells. The neighborhood may include one or more other load cells. The load cells of a weighing system being arranged in an array does not necessarily require that all the load cells are arranged in a rectangular arrangement, while all the load cells may be arranged in a triangle arrangement or arrangements with other shapes which may be matched to a matrix array.

The local small neighborhood may be used to estimate the weighing output of a failed load cell. $W_1 \ldots W_8$ represent the weighing outputs of each load cell corresponding to the eight points in the local small neighborhood, respectively. The local small neighborhood may be represented as $$\begin{bmatrix} W_1 & W_2 & W_3 \\ W_4 & W. & W_5 \\ W_6 & W_7 & W_8 \end{bmatrix}.$$

Thus, the central element W. to be estimated (i.e., the weighing output of the failed load cell) may be represented as $$W.=f(W_1, W_2, W_3, W_4, W_5, W_6, W_7),$$

where f is a non-linear mapping whose mapping relationship differs for different weighing systems, and may be determined by a large number of experiment data.

If the failed load cell is located at an edge position, there may be an occurrence of zero value in $W_1 \ldots W_8$.

If there are other failed load cells in the local small neighborhood of this failed load sensor, the neighboring point values corresponding to other failed load cells are zeros.

In an exemplary embodiment, the combined weighing value of the whole weighing system equals to the sum of the outputs of all the normal load cells and the estimated output values of all the failed load cells, and may be represented by:

$$W = \sum_{i=1}^{m} W_i + \sum_{j=0}^{n} W_{\cdot j}$$

wherein,
W is a combined weighing value of the weighing system;
$W_i$ is the weighing output of each normal load cell;
$W_{\cdot j}$ is the estimated output value of each failed load cell;
m is the total number of normal load cells and is an integer, and m≥1;
n is the total number of normal load cells and is an integer, and n≥0;

When a number of load cells fail simultaneously, an exemplary method as disclosed herein can be used to estimate the output of each failed load cell, and these estimates are combined with the output values of other load cells to form a combined weighing output of the weighing system, which is outputted on the terminal display device as a weighing result.

Exemplary embodiments of the weighing system according to the present disclosure will be discussed hereinafter in detail in connection with the weighing method already discussed.

Embodiment 1: Weighing System of a Mixing Station

Figure 2:
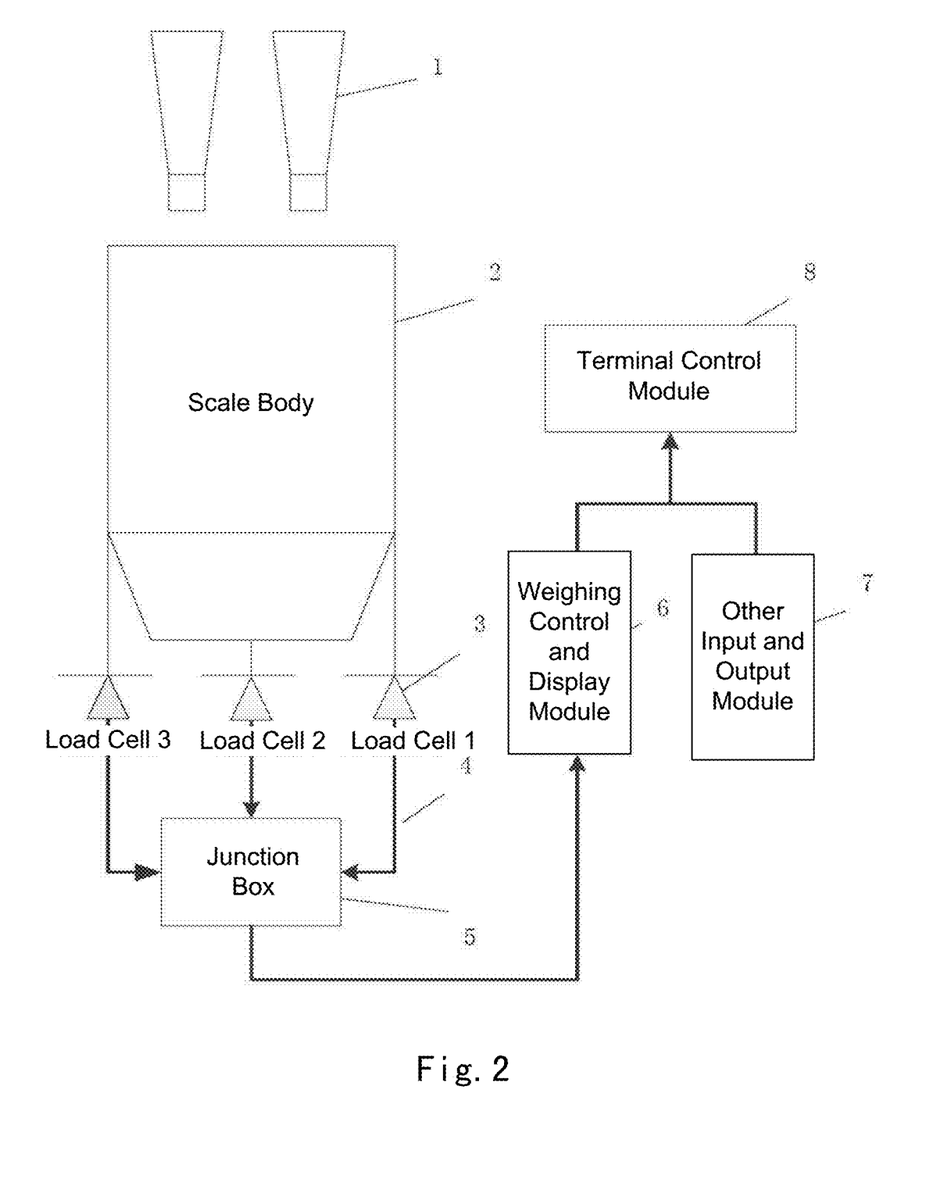
FIG. 2 illustrates a block diagram of an exemplary weighing system according to an embodiment of the present disclosure.

With reference to FIG. 2, the weighing system of a mixing station is primarily composed of a feed bin 1, a scale body 2, load cells 3, a communication cable 4, a junction box 5, a weighing control and display module 6, other input and output modules 7, and a terminal control module 8. The feed bin 1 includes at least one feed bin, through which materials, such as cements and sandstones, are filled into the scale 2. The scale body is a carrier of the weighing system, having a hopper shaped structure and equipped with several load cells. The load cells 3 may be analog load cells or digital load cells, and may be pull-type load cells or push-type load cells. The weighing signal of each load cell is transferred to the junction box 5 through the communication cable 4.

If the load cells 2 in the system are analog load cells, the junction box 4 is a digital junction box. The analog signal output from each analog load cell is translated into a digital weighing signal and transferred to the weighing display module 6. If the load cells 3 in the system are digital load cells, the junction box 5 is a digital junction box and is optional. If the weighing system employs CAN bus to communicate, the junction box 5 may be omitted. Under such situation, the output from each digital load cell is directly transferred to the weighing control and display module 6 through the communication cable 4. The weighing control and display module 6 receives each weighing signal to form a combined signal for display, and meanwhile may control and configure the combined weighing signal (e.g., calibrating the combined weighing signal). Other input and output modules 7 can include other scales in the system, a stroke switching module, a feed control module, an alarm module, etc. The terminal control module 8 is a human-computer interaction module, which may be a control computer or a PLC device. The operators control the whole weighing system of the mixing station through the terminal control module 8.

Exemplary embodiments may be applied in a weighing system of a mixing station. As shown in FIG. 2, three load cells are equipped on the scale body 2 to obtain the weight of the materials within the scale body 2. If one load cell fails during weighing (represented in black), that is, with no weighing signal output, then the combined weighing data of the whole weighing system is not accurate even the other two load cells work normally, and thus normal weighing cannot be continued.

A weighing control module and a display module are regarded as a whole in the weighing control and display module 6, where the weighing control module may be a circuit or solidified program codes. Upon the start of each weighing, the weighing control and display module 6 will poll all the load cells 3 in the system and determine whether there is any failed load cell (i.e., the load cell with no weighing output). If there is no failed load cell in the system, that is, all the load cells work normally, the weighing control and display module 6 may synthesize the output value of each load cell to compute a combined weighing value and display the same. If there is failed load cell(s) in the system, the weighing control and display module 6 may obtain weighing outputs from normally working load cells and record the position of the failed load cell(s), and estimate the weighing output of the failed load cell(s) based on a local small neighborhood method.

The weighing system can include three load cells located within a same horizontal plane (in the top view, the three load cells are located at three vertexes of an equilateral triangle). Thus, when one load cell fails, its local small neighborhood comprises two normal load cells (i.e., the two points on the diagonal line of a rectangle array). The weighing output of this failed load cell is estimated below:

$$W_{\cdot}=f(W_1,W_2),$$

where f is a non-linear mapping which is mathematically represented below:

$$f(W_1, W_2) = [k_1, k_2] \times \begin{bmatrix} W_1 \\ W_2 \end{bmatrix} + [W_1, W_2] \times \begin{bmatrix} p_{11} & p_{12} \\ p_{21} & p_{22} \end{bmatrix} \times \begin{bmatrix} W_1 \\ W_2 \end{bmatrix}$$

where $W_1$, $W_2$ are weighing outputs of the two normal load cells;

$W_{\cdot}$ is an estimated output weighing value of the failed load cell;

$k_1, k_2$ are linear estimation coefficients; and $p_{11}, p_{12}, p_{13}$, and $p_{14}$ are non-linear estimation coefficients.

The non-linear mapping f and its respective coefficients may be determined from a large number of experimental data under the circumstance that the three load cells and the weighing system work normally with the following steps:

1) a few materials to be weighed are filled into the scale body 2 through the feed bin 1, the weighing outputs $W_1$, $W_2$, and $W_3$ from the load cells in the scale body 2 are read and recorded after the scale body 2 becomes stable;

2) materials to be weighed are further filled into the scale body 2 through the feed bin 1, the weighing outputs $W_1$, $W_2$, and $W_3$ from the load cells in the scale body 2 are read after the scale body 2 becomes stable, n sets of weighing data are recorded, where n is greater than the number of coefficients to be estimated (in this case is 6);

3) each sets of data is substituted into the following non-linear equation set:

$$\begin{cases} [k_1, k_2] \times \begin{bmatrix} W_1(1) \\ W_2(1) \end{bmatrix} + [W_1(1), W_2(1)] \times \begin{bmatrix} p_{11} & p_{12} \\ p_{21} & p_{22} \end{bmatrix} \times \begin{bmatrix} W_1(1) \\ W_2(1) \end{bmatrix} - W_3(1) = 0 \\ [k_1, k_2] \times \begin{bmatrix} W_1(2) \\ W_2(2) \end{bmatrix} + [W_1(2), W_2(2)] \times \begin{bmatrix} p_{11} & p_{12} \\ p_{21} & p_{22} \end{bmatrix} \times \begin{bmatrix} W_1(2) \\ W_2(2) \end{bmatrix} - W_3(2) = 0 \\ \vdots \\ [k_1, k_2] \times \begin{bmatrix} W_1(n) \\ W_2(n) \end{bmatrix} + [W_1(n), W_2(n)] \times \begin{bmatrix} p_{11} & p_{12} \\ p_{21} & p_{22} \end{bmatrix} \times \begin{bmatrix} W_1(n) \\ W_2(n) \end{bmatrix} - W_3(n) = 0 \end{cases}$$

With linear estimation coefficients $k_1$, $k_2$ and non-linear estimation coefficients $p_{11}$, $p_{12}$, $p_{21}$, $p_{21}$ being unknown numbers in the equations, the non-linear equation set may be solved and the value of each coefficient $k_1$, $k_2$, $p_{11}$, $p_{12}$, $p_{21}$, $p_{21}$ may be computed.

4) The experiment in Step 2) is repeated to record several sets of weighing outputs from three load cells that are substituted into the following expression so as to estimate the weighing output of the load cell 3 using the weighing outputs of the load cells 1 and 2:

$$f(W_1, W_2) = [k_1, k_2] \times \begin{bmatrix} W_1 \\ W_2 \end{bmatrix} + [W_1, W_2] \times \begin{bmatrix} p_{11} & p_{12} \\ p_{21} & p_{22} \end{bmatrix} \times \begin{bmatrix} W_1 \\ W_2 \end{bmatrix}.$$

If the difference between the estimated weighing values computed based on this expression and the actually tested weighing values of load cells is within an error range, this mathematical expression is then used to determine the non-linear mapping relationship.

5) By using this local small neighborhood method, the weighing values of any two load cells may be utilized to estimate the weighing value of a third load cell, and the sets of non-linear mapping relationship expressions are stored in a memory in the load cell.

The weighing output values of each normally working load cell and the estimated weighing value of the failed load cell are synthesized to compute a combined weighing value as follows:

$$W = W_1 + W_2 + W_{\cdot}$$

where

W is a combined weighing value of the weighing system;

$W_1$, $W_2$ are weighing outputs of two normal load cells;

$W_{\cdot}$ is an estimated output weighing value of the failed load cell 3.

The weighing control and display module 6 utilizes the combined weighing value W as the final weighing output of the weighing system and displays the same.

Embodiment 2: Weighing System of a Platform Scale

Figure 3:
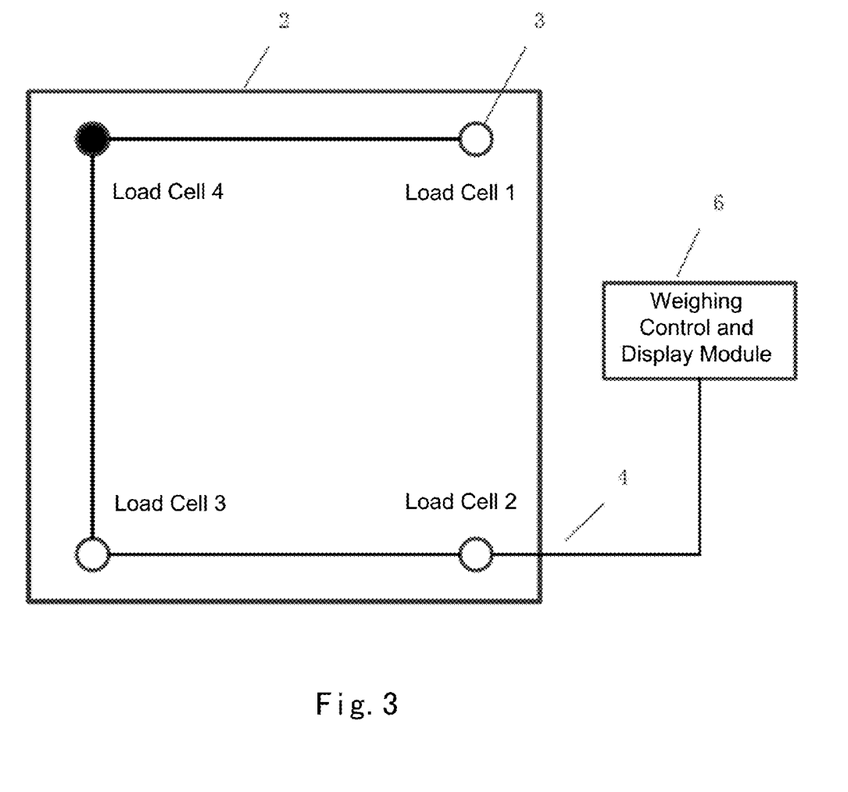
FIG. 3 illustrates a block diagram of an exemplary weighing system according to another embodiment of the present disclosure.

With reference to FIG. 3, the weighing system of a platform scale is primarily composed of a scale body 2, four digital load cells 3, a communication cable 4, and a weighing control and display module 6. This weighing system employs CAN bus communication protocol and is linked in chain. Thus, no junction box is needed. The four digital load cells 3 are slave stations, while the weighing control and display module 6 is a primary station. Terminal resistors are disposed on both ends of the CAN bus network connection. The weighing control and display module 6 receives each weighing signal to form a combined weighing signal for display, and meanwhile control and configure the weighing signal of the whole scale (e.g., calibrating the whole scale).

As shown in FIG. 3, four load cells 3 are equipped on the scale body 2 to obtain the weight of the objects to be weighed on the scale body 2. If one load cell fails during weighing (represented in black), that is, with no weighing signal output, then the combined weighing data of the whole weighing system is not accurate even the other three load cells work normally, and thus normal weighing cannot be continued.

Upon the start of each weighing, the weighing control and display module 6 will poll all the load cells 3 in the system and determine whether there is any failed load cell (i.e., load cell with no weighing output). If there is no failed load cell in the system, that is, all the load cells 3 work normally, the weighing control and display module 6 may synthesize the output value of each load cell to compute a combined weighing value and display the same. If there is failed load cell(s) in the system, the weighing control and display module 6 may obtain weighing outputs from normally working load cells and record the position of the failed load cell(s), and estimate the weighing output of the failed load cell(s) based on a local small neighborhood method. Since this weighing system includes four load cells, when one load cell fails, its local small neighborhood will include three normal load cells. The weighing output of this failed load cell is estimated below:

$$W_\cdot = f(W_1, W_2, W_3),$$

where f is a non-linear mapping which is mathematically represented below:

$$f(W_1, W_2, W_3) = [k_1, k_2, k_3] \times \begin{bmatrix} W_1 \\ W_2 \\ W_3 \end{bmatrix} + [W_1, W_2, W_3] \times \begin{bmatrix} p_{11} & p_{12} & p_{13} \\ p_{21} & p_{22} & p_{23} \\ p_{31} & p_{32} & p_{33} \end{bmatrix} \times \begin{bmatrix} W_1 \\ W_2 \\ W_2 \end{bmatrix} + [W_1, W_2, W_3] \times \begin{bmatrix} q_{11} & q_{12} & q_{13} \\ q_{21} & q_{22} & q_{23} \\ q_{31} & q_{32} & q_{33} \end{bmatrix} \times \begin{bmatrix} W_1^2 \\ W_2^2 \\ W_3^2 \end{bmatrix}$$

where $W_1$, $W_2$, $W_3$ are weighing outputs of the three normal load cells;

$W_\cdot$ is an estimated output weighing value of the failed load cell;

$k_1$, $k_2$, $k_3$ are linear estimation coefficients;

$p_{11}$, $p_{12}$, ... $p_{33}$ are quadratic non-linear estimation coefficients; and $q_{11}$, $q_{12}$, ... $q_{33}$ are cubic non-linear estimation coefficients.

The non-linear mapping f and its respective coefficients may be determined from a large number of experimental data under the circumstance that the four load cells and the weighing system work normally with the following steps:

1) small loads or weights are loaded onto the scale body 2, the weighing outputs $W_1$, $W_2$, $W_3$, and $W_4$ from the four load cells in the scale body 2 are read and recorded after the scale body 2 becomes stable;

2) loads or weights are further loaded onto the scale body 2 to increase the weights, the weighing outputs $W_1$, $W_2$, $W_3$ from the load cells in the scale body 2 are read after the scale body 2 becomes stable, n sets of weighing data are recorded, where n is greater than the number of coefficients to be estimated (in this case is 21);

3) each sets of data is substituted into the following non-linear equation set:

$$\begin{cases} [k_1, k_2, k_3] \times \begin{bmatrix} W_1(1) \\ W_2(1) \\ W_3(1) \end{bmatrix} + [W_1(1), W_2(1), W_3(1)] \times \begin{bmatrix} p_{11} & p_{12} & p_{13} \\ p_{21} & p_{22} & p_{23} \\ p_{31} & p_{32} & p_{33} \end{bmatrix} \times \begin{bmatrix} W_1(1) \\ W_2(1) \\ W_3(1) \end{bmatrix} + [W_1(1), W_2(1), W_3(1)] \times \begin{bmatrix} q_{11} & q_{12} & q_{13} \\ q_{21} & q_{22} & q_{23} \\ q_{31} & q_{32} & q_{33} \end{bmatrix} \times \begin{bmatrix} W_1(1)^2 \\ W_2(1)^2 \\ W_3(1)^2 \end{bmatrix} - W_4(1) = 0 \\[6pt] [k_1, k_2, k_3] \times \begin{bmatrix} W_1(2) \\ W_2(2) \\ W_3(2) \end{bmatrix} + [W_1(2), W_2(2), W_3(2)] \times \begin{bmatrix} p_{11} & p_{12} & p_{13} \\ p_{21} & p_{22} & p_{23} \\ p_{31} & p_{32} & p_{33} \end{bmatrix} \times \begin{bmatrix} W_1(2) \\ W_2(2) \\ W_3(2) \end{bmatrix} + [W_1(2), W_2(2), W_3(2)] \times \begin{bmatrix} q_{11} & q_{12} & q_{13} \\ q_{21} & q_{22} & q_{23} \\ q_{31} & q_{32} & q_{33} \end{bmatrix} \times \begin{bmatrix} W_1(2)^2 \\ W_2(2)^2 \\ W_3(2)^2 \end{bmatrix} - W_4(2) = 0 \\[6pt] \vdots \\[6pt] [k_1, k_2, k_3] \times \begin{bmatrix} W_1(n) \\ W_2(n) \\ W_3(n) \end{bmatrix} + [W_1(n), W_2(n), W_3(n)] \times \begin{bmatrix} p_{11} & p_{12} & p_{13} \\ p_{21} & p_{22} & p_{23} \\ p_{31} & p_{32} & p_{33} \end{bmatrix} \times \begin{bmatrix} W_1(n) \\ W_2(n) \\ W_3(n) \end{bmatrix} + [W_1(n), W_2(n), W_3(n)] \times \begin{bmatrix} q_{11} & q_{12} & q_{13} \\ q_{21} & q_{22} & q_{23} \\ q_{31} & q_{32} & q_{33} \end{bmatrix} \times \begin{bmatrix} W_1(n)^2 \\ W_2(n)^2 \\ W_3(n)^2 \end{bmatrix} - W_4(n) = 0 \end{cases}$$

With linear estimation coefficients $k_1$, $k_2$, $k_3$, quadratic non-linear estimation coefficients $p_{11}$, $p_{12}$ ... $p_{33}$, and cubic non-linear estimation coefficients $q_{11}$, $q_{12}$, ... $q_{33}$ being unknown numbers in the equations, the non-linear equation set may be solved and the value of each coefficient may be computed.

4) The experiment in Step 2) is repeated to record several sets of weighing outputs from four load cells that are substituted into the following expression so as to estimate the weighing output of the load cell 4 using the weighing outputs of the load cells 1, 2, and 3:

$$f(W_1, W_2, W_3) = [k_1, k_2, k_3] \times \begin{bmatrix} W_1 \\ W_2 \\ W_3 \end{bmatrix} + [W_1, W_2, W_3] \times$$

$$\begin{bmatrix} p_{11} & p_{12} & p_{13} \\ p_{21} & p_{22} & p_{23} \\ p_{31} & p_{32} & p_{33} \end{bmatrix} \times \begin{bmatrix} W_1 \\ W_2 \\ W_3 \end{bmatrix} + [W_1, W_2, W_3] \times \begin{bmatrix} q_{11} & q_{12} & q_{13} \\ q_{21} & q_{22} & q_{23} \\ q_{31} & q_{32} & q_{33} \end{bmatrix} \times \begin{bmatrix} W_1^2 \\ W_2^2 \\ W_3^2 \end{bmatrix}.$$

If the difference between the estimated weighing values computed based on this expression and the actually tested weighing values of load cells is within an error range, this mathematical expression is then used to determine the non-linear mapping relationship.

5) By using this local small neighborhood method, the weighing values of any three load cells may be utilized to estimate the weighing value of a fourth load cell, and the sets of non-linear mapping relationship expressions are stored in a memory in the load cell.

The weighing output values of each normally working load cell and the estimated weighing value of the failed load cell are synthesized to compute a combined weighing value as follows:

$$W = W_1 + W_2 + W_3 + W.$$

where
W is a combined weighing value of the weighing system;
$W_1$, $W_2$, $W_3$ are weighing outputs of three normal load cells;
W. is an estimated output weighing value of the failed load cell 4.

The weighing control and display module 6 utilizes the combined weighing value W as the final weighing output of the weighing system and displays the same.

Embodiment 3: Weighing System of a Vehicle Scale

Figure 4:
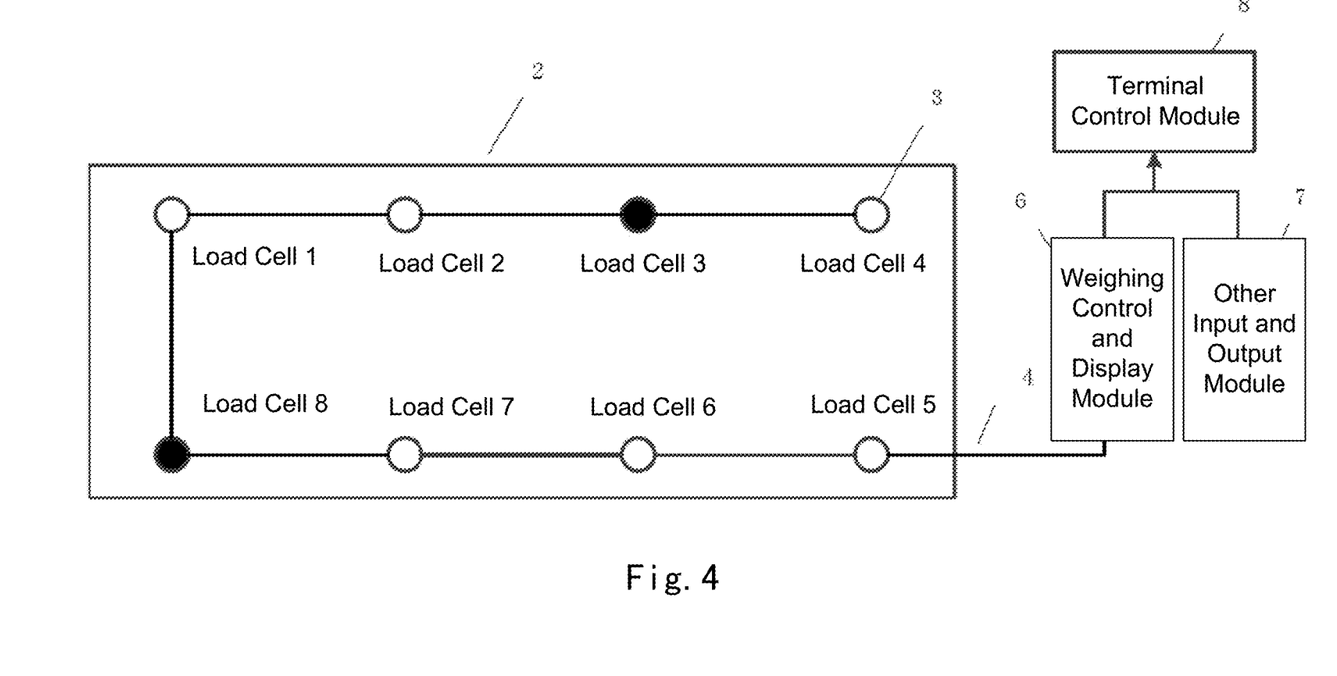
FIG. 4 illustrates a block diagram of an exemplary weighing system according to a further embodiment of the present disclosure.

With reference to FIG. 4, the weighing system of a vehicle scale is primarily composed of a scale body 2, eight digital load cells 3, a communication cable 4, a weighing control and display module 6, other input and output modules 7, and a terminal control module 8. Similar to the Embodiment 2, this weighing system employs CAN bus communication protocol and is linked in chain. Thus, no junction box is needed. The eight digital load cells 3 are slave stations, while the weighing control and display module 6 is a primary station. Terminal resistors are disposed on both ends of the CAN bus network connection. The weighing control and display module 6 receives each weighing signal to form a combined weighing signal for display, and meanwhile control and configure the weighing signal of the whole scale (e.g., calibrating the whole scale). Other input and output modules 7 are connected to the terminal control module 8, and include a card reader module, a camera module, a printer module in the system, etc. The terminal control module 8 is a human-computer interaction module, and can be a computer. The operators control the whole weighing system of the vehicle scale through the terminal control module 8.

As shown in FIG. 4, eight load cells 3 are equipped on the scale body 2 to obtain the weight of the objects to be weighed on the scale body 2. If several load cells fail during weighing (represented in black), that is, with no weighing signal output, then the combined weighing data of the whole weighing system is not accurate even the other load cells work normally, and thus normal weighing cannot be continued. In such a case, an exemplary method of the present disclosure is applied to the weighing system to assure that the weighing system performs uninterrupted weighing.

FIG. 1 shows a logical flowchart of an exemplary embodiment of the method according to the present disclosure. The program codes of the method are solidified in the weighing control and display module 6. Similar to Embodiment 1, upon the start of each weighing, the weighing control and display module 6 will poll all the load cells 3 in the system and determine whether there is any failed load cell (i.e., load cell with no weighing output). If there is no failed load cell in the system, that is, all the load cells 3 work normally, the weighing control and display module 6 may synthesize the output value of each load cell to compute a combined weighing value and display the same. If there is failed load cell(s) in the system, the weighing control and display module 6 may obtain weighing outputs from normally working load cells and record the position of the failed load cell(s), and estimate the weighing output of the failed load cell(s) based on a local small neighborhood method. Since this weighing system includes eight load cells, thus, when two load cells fail, a local small neighborhood method is respectively used to computer the weighing output value of the two failed load cells.

The failed load cell 3 has five normal load cells in its local small neighborhood (i.e., load cell 2, load cell 4, load cell 5, load cell 6, and load cell 7). The weighing output of the failed load cell 3 is estimated below:

$$W_{.3} = f(W_2, W_4, W_5, W_6, W_7),$$

where f is a non-linear mapping.
$W_2$, $W_4$, $W_5$, $W_6$, $W_7$ are weighing outputs of the five normal load cells in the local small neighborhood;
$W_{.3}$ is an estimated output weighing value of the failed load cell 3.

The failed load cell 8 has three normal load cells in its local small neighborhood (i.e., load cell 1, load cell 2, and load cell 7). The weighing output of the failed load cell 8 is estimated below:

$$W_{.8} = f(W_1, W_2, W_7),$$

where f is a non-linear mapping.
$W_1$, $W_2$, $W_7$ are weighing outputs of the three normal load cells in the local small neighborhood;
$W_{.8}$ is an estimated output weighing value of the failed load cell 8.

The mathematical expression of the non-linear mapping f in this embodiment may be a cubic non-linear expression as below:

$$f = [k_1, k_2, \ldots k_m] \times \begin{bmatrix} W_1 \\ W_2 \\ \vdots \\ W_m \end{bmatrix} + [W_1,$$

$$W_2, \ldots W_m] \times \begin{bmatrix} p_{11} & p_{12} & \cdots & p_{1m} \\ p_{21} & p_{22} & \cdots & p_{2m} \\ \vdots & \vdots & \vdots & \vdots \\ p_{m1} & p_{m2} & \cdots & p_{mm} \end{bmatrix} \times \begin{bmatrix} W_1 \\ W_2 \\ \vdots \\ W_m \end{bmatrix} +$$

-continued $$[W_1, W_2, \ldots W_m] \times \begin{bmatrix} q_{11} & q_{12} & \cdots & q_{1m} \\ q_{21} & q_{22} & \cdots & q_{2m} \\ \vdots & \vdots & \vdots & \vdots \\ q_{m1} & q_{m2} & \cdots & q_{mm} \end{bmatrix} \times \begin{bmatrix} W_1^2 \\ W_2^2 \\ \vdots \\ W_m^2 \end{bmatrix}$$

where, m is the number of normal load cells in the local small neighborhood;

$W_1, W_2, \ldots W_m$ are weighing outputs of the normal load cells in the local small neighborhood;

W. is an estimated output weighing value of the failed load cell;

$k_1, k_2, k_3$ are linear estimation coefficients;

$p_{11}, p_{12}, \ldots p_{mm}$ are quadratic non-linear estimation coefficients; and $q_{11}, q_{12}, \ldots q_{mm}$ are cubic non-linear estimation coefficients.

The non-linear mapping f and its respective coefficients may be determined from a large number of experimental data under the circumstance that the weighing system of the vehicle scale and all the load cells work normally with the following steps:

1) small loads or weights are loaded onto the scale body 2, the weighing outputs $W_2, W_4, W_5, W_6, W_7, W_8$ from the load cell 8 and the five load cells in its local small neighborhood in the scale body 2 are read and recorded after the scale body 2 becomes stable;

2) loads or weights are further loaded onto the scale body 2 to increase the weights, the weighing outputs $W_2, W_4, W_5, W_6, W_7, W_8$ from the load cells in the scale body 2 are read after the scale body 2 becomes stable, n sets of weighing data are recorded, where n is greater than the number of coefficients to be estimated (in this case is 55);

3) each set of data is substituted into the following non-linear equation set:

$$\begin{cases} [k_1, k_2, \ldots k_5] \times \begin{bmatrix} W_2(1) \\ W_4(1) \\ \vdots \\ W_7(1) \end{bmatrix} + [W_2(1), W_4(1), \ldots W_7(1)] \times \begin{bmatrix} p_{11} & p_{12} & \cdots & p_{15} \\ p_{21} & p_{22} & \cdots & p_{25} \\ \vdots & \vdots & \vdots & \vdots \\ p_{51} & p_{52} & \cdots & p_{55} \end{bmatrix} \times \\ \begin{bmatrix} W_2(1) \\ W_4(1) \\ \vdots \\ W_7(1) \end{bmatrix} + [W_2(1), W_4(1), \ldots W_7(1)] \times \begin{bmatrix} q_{11} & q_{12} & \cdots & q_{15} \\ q_{21} & q_{22} & \cdots & q_{25} \\ \vdots & \vdots & \vdots & \vdots \\ q_{51} & q_{52} & \cdots & q_{55} \end{bmatrix} \times \begin{bmatrix} W_2(1)^2 \\ W_4(1)^2 \\ \vdots \\ W_7(1)^2 \end{bmatrix} - W_8(1) = 0 \\ [k_1, k_2, \ldots k_5] \times \begin{bmatrix} W_2(2) \\ W_4(2) \\ \vdots \\ W_7(2) \end{bmatrix} + [W_2(2), W_4(2), \ldots W_7(2)] \times \begin{bmatrix} p_{11} & p_{12} & \cdots & p_{15} \\ p_{21} & p_{22} & \cdots & p_{25} \\ \vdots & \vdots & \vdots & \vdots \\ p_{51} & p_{52} & \cdots & p_{55} \end{bmatrix} \times \\ \begin{bmatrix} W_2(2) \\ W_4(2) \\ \vdots \\ W_7(2) \end{bmatrix} + [W_2(2), W_4(2), \ldots W_7(2)] \times \begin{bmatrix} q_{11} & q_{12} & \cdots & q_{15} \\ q_{21} & q_{22} & \cdots & q_{25} \\ \vdots & \vdots & \vdots & \vdots \\ q_{51} & q_{52} & \cdots & q_{55} \end{bmatrix} \times \begin{bmatrix} W_2(2)^2 \\ W_4(2)^2 \\ \vdots \\ W_7(2)^2 \end{bmatrix} - W_8(2) = 0 \\ \vdots \\ [k_1, k_2, \ldots k_5] \times \begin{bmatrix} W_2(n) \\ W_4(n) \\ \vdots \\ W_7(n) \end{bmatrix} + [W_2(n), W_4(n), \ldots W_7(n)] \times \begin{bmatrix} p_{11} & p_{12} & \cdots & p_{15} \\ p_{21} & p_{22} & \cdots & p_{25} \\ \vdots & \vdots & \vdots & \vdots \\ p_{51} & p_{52} & \cdots & p_{55} \end{bmatrix} \times \\ \begin{bmatrix} W_2(n) \\ W_4(n) \\ \vdots \\ W_7(n) \end{bmatrix} + [W_2(n), W_4(n), \ldots W_7(n)] \times \begin{bmatrix} q_{11} & q_{12} & \cdots & q_{15} \\ q_{21} & q_{22} & \cdots & q_{25} \\ \vdots & \vdots & \vdots & \vdots \\ q_{51} & q_{52} & \cdots & q_{55} \end{bmatrix} \times \begin{bmatrix} W_2(n)^2 \\ W_4(n)^2 \\ \vdots \\ W_7(n)^2 \end{bmatrix} - W_8(n) = 0 \end{cases}$$

With linear estimation coefficients $k_1, k_2, k_3$, quadratic non-linear estimation coefficients $p_{11}, p_{12} \ldots p_{55}$, and cubic non-linear estimation coefficients $q_{11}, q_{12}, \ldots q_{55}$ being unknown numbers in the equations, the non-linear equation set may be solved and the value of each coefficient may be computed.

4) The experiment in Step 2) is repeated to record several sets of weighing outputs from four load cells that are substituted into the following expression so as to estimate the weighing output of the load cell 8 using the weighing outputs of the load cells 2, 4, 5, 6, and 3:

$$f(W_2, W_4, W_5, W_6, W_7) = [k_1, k_2, \ldots k_5] \times \begin{bmatrix} W_2 \\ W_4 \\ \vdots \\ W_7 \end{bmatrix} +$$

$$[W_2, W_4, \ldots W_7] \times \begin{bmatrix} p_{11} & p_{12} & \cdots & p_{15} \\ p_{21} & p_{22} & \cdots & p_{25} \\ \vdots & \vdots & \vdots & \vdots \\ p_{51} & p_{52} & \cdots & p_{55} \end{bmatrix} \times \begin{bmatrix} W_2 \\ W_4 \\ \vdots \\ W_7 \end{bmatrix} +$$

$$[W_2, W_4, \ldots W_7] \times \begin{bmatrix} q_{11} & q_{12} & \cdots & q_{15} \\ q_{21} & q_{22} & \cdots & q_{25} \\ \vdots & \vdots & \vdots & \vdots \\ q_{51} & q_{52} & \cdots & q_{55} \end{bmatrix} \times \begin{bmatrix} W_2^2 \\ W_4^2 \\ \vdots \\ W_7^2 \end{bmatrix}.$$

If the difference between the estimated weighing values computed based on this expression and the actually tested weighing values of load cells is within an error range, this mathematical expression is then used to determine the non-linear mapping relationship.

5) By using this local small neighborhood method, the weighing values of other load cells in the local small neighborhood of a load cell may be utilized to estimate the weighing value of the load cell, and the sets of non-linear mapping relationship expressions are stored in a memory in the load cell.

The weighing output values of each normally working load cell and the estimated weighing value of the failed load cell are synthesized to compute a combined weighing value as follows:

$$W = (W_1 + W_2 + W_4 + W_5 + W_6 + W_7) + (W_{*3} + W_{*8})$$

where
W is a combined weighing value of the weighing system;
$W_1$, $W_2$, $W_4$, $W_5$, $W_6$, $W_7$ are weighing outputs of six normal load cells;
$W_{*3}$ and $W_{*8}$ are estimated output weighing values of the two failed load cells.

The weighing control and display module 6 utilizes the combined weighing value W as the final weighing output of the weighing system and displays the same.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A weighing method for providing a combined weighing value with a weighing system having uninterrupted weighing functions, the weighing system having a plurality of load cells, the weighing method comprising:
   a) arranging the plurality of load cells so that each load cell has a local small neighborhood, the local small neighborhood being a neighborhood defined by four adjacent points in front, back, left, and right of the load cell and four points on the diagonal directions in a matrix, the local small neighborhood of each load cell having other load cells disposed on at least some points;
   b) determining, by a weighing control module of the weighing system, upon a start of a weighing operation, whether there is at least one load cell having no weighing output,
   when there is no load cell having no weighing output, then a combined weighing value of weighing system is determined according to the weighing outputs of all the load cells; and
   when there is at least one load cell having no weighing output, the at least one load cell being at least one failed load cell, then a calculation is performed by the weighing control module as follows for each of the at least one failed load cell;

$$W_* = f(W_1, W_2, \ldots W_m) = [k_1, k_2, \ldots k_m] \times \begin{bmatrix} W_1 \\ W_2 \\ \vdots \\ W_m \end{bmatrix} +$$

$$\ldots + [W_1, W_2, \ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mn}(n) \end{bmatrix} \times \begin{bmatrix} W_1^n \\ W_2^n \\ \vdots \\ W_m^n \end{bmatrix}$$

where,
m is a number of adjacent normal load cells in the local small neighborhood of the failed load cell;
$W_1, W_2, \ldots W_m$ are weighing outputs of the normal load cells in the local small neighborhood;
$W_*$ is an estimated output weighing value of the failed load cell;
$k_1, k_2, \ldots k_m$ are linear estimation coefficients;
$q_{11}(n), q_{12}(n), \ldots q_{max}(n)$ are nth non-linear estimation coefficients, n being an integer greater than or equal to 2;
the linear estimation coefficients and the nth non-linear estimation coefficients being determined by substituting experimental data derived by at least $m+(n-1)m^2$ times of weighing into an equation as follows under a circumstance that all the load cells work normally;

$$[k_1, k_2, \ldots k_m] \times \begin{bmatrix} W_1 \\ W_2 \\ \vdots \\ W_m \end{bmatrix} + \ldots + [W_1, W_2,$$

$$\ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mn}(n) \end{bmatrix} \times \begin{bmatrix} W_1^n \\ W_2^n \\ \vdots \\ W_m^n \end{bmatrix} - W_* = 0$$

where, $W_*$ is a weighing output of the failed load cell when the failed load cell works normally;
   c) providing, by the weighing control module, the combined weighing value of the whole weighing system equal to the weighing outputs of all the normal load cells and the estimated weighing outputs of all the at least one failed load cell as follows:

$$W = \sum_{i=1}^{m^*} W_i + \sum_{j=0}^{p} W_{*j}$$

where,
W is a combined weighing value of the weighing system;
$W_i$ the weighing output of each normal load cell;
$W_{*j}$ is the estimated weighing value of each failed load cell;
m* is the total number of normal load cells and is an integer, and m*≥1;
p is a total number of failed load cells and is an integer, and p≥0.

2. A weighing system having uninterrupted weighing functions for providing a combined weighing value, wherein the weighing system comprises:
   a plurality of load cells;
   a weighing platform or carrier; and
   a weighing control module, the weighing control module being coupled to the plurality of load cells, where the plurality of load cells are arranged so that each load cell has a local small neighborhood, the local small neighborhood being a neighborhood defined by four adjacent points in front, back, left, and right of the load cell and four points on diagonal directions in a matrix, the local small neighborhood of each load cell having other load cells disposed on at least some points;
   the weighing control module being configured to poll the plurality of load cells to determine, at a start of a weighing operation, whether there is at least one load cell having no weighing output, and when there is at least one load cell having no weighing output, the at least one load cell being at least one failed load cell, then the weighing control module is configured to perform a calculation as follows for each of the at least one failed load cell;

$$W_* = f(W_1, W_2, \ldots W_m) = [k_1, k_2, \ldots k_m] \times \begin{bmatrix} W_1 \\ W_2 \\ \vdots \\ W_m \end{bmatrix} +$$

$$\ldots + [W_1, W_2, \ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mn}(n) \end{bmatrix} \times \begin{bmatrix} W_1^n \\ W_2^n \\ \vdots \\ W_m^n \end{bmatrix}$$

where, m is a number of adjacent normal load cells in the local small neighborhood of the failed load cell;

$W_1, W_2, \ldots W_m$ are weighing outputs of the normal load cells in the local small neighborhood;

$W_*$ is an estimated output weighing value of the failed load cell;

m are linear estimation coefficients;

$q_{11}(n), q_{12}(n), \ldots q_{max}(n)$ are nth non-linear estimation coefficients, n being an integer greater than or equal to 2;

the linear estimation coefficients and the nth non-linear estimation coefficients being determined by substituting experimental data derived by at least $m+(n-1)m^2$ times of weighing into an equation as follows under a circumstance that all the load cells work normally;

$$[k_1, k_2, \ldots k_m] \times \begin{bmatrix} W_1 \\ W_2 \\ \vdots \\ W_m \end{bmatrix} + \ldots + [W_1, W_2,$$

$$\ldots W_m] \times \begin{bmatrix} q_{11}(n) & q_{12}(n) & \ldots & q_{1m}(n) \\ q_{21}(n) & q_{22}(n) & \ldots & q_{2m}(n) \\ \vdots & \vdots & \vdots & \vdots \\ q_{m1}(n) & q_{m2}(n) & \ldots & q_{mn}(n) \end{bmatrix} \times \begin{bmatrix} W_1^n \\ W_2^n \\ \vdots \\ W_m^n \end{bmatrix} - W_* = 0$$

where, $W_*$ is a weighing output of the failed load cell when the failed load cell works normally;

the weighing control module being configured to provide a combined weighing value of the whole weighing system being equal to weighing outputs of all the normal load cells and the estimated weighing outputs of all the at least one failed load cells and is expressed below:

$$W = \sum_{i=1}^{m^*} W_i + \sum_{j=0}^{p} W_j$$

where,

W is a combined weighing value of the weighing system;

$W_i$ is the weighing output of each normal load cell;

$W_j$ is the estimated weighing value of each failed load cell;

is a total number of normal load cells and is an integer, and $m^* \geq 1$; and p is a total number of failed load cells and is an integer, and $p \geq 0$.

3. The weighing system as recited in claim 2, wherein the weighing system is a weighing system of a mixing station.

4. The weighing system as recited in claim 2, wherein the weighing system is a platform weighing system.

5. The weighing system as recited in claim 2, wherein the weighing system is a weighing system of a vehicle scale.

6. The weighing method as recited in claim 1, wherein the weighing system is a weighing system of a mixing station.

7. The weighing method as recited in claim 1, wherein the weighing system is a platform weighing system.

8. The weighing method as recited in claim 1, wherein the weighing system is a weighing system of a vehicle scale.

9. The weighing method according to claim 1, comprising:
polling each load cell to identify the at least one load cell having no weighing output; and
providing the combined weighing value by determining estimated weighing outputs of plural load cells having no weighing output including the at least one load cells having no weighing output.

10. The weighing method according to claim 9, comprising:
recording the location of the at least one load cell having no weighing output.

11. The weighing method according to claim 9, wherein the combined weighing value is provided as an analog output.

12. The weighing method according to claim 9, wherein the combined weighing value is provided as a digital output.

13. The weighing system according to claim 2, wherein the load cells are digital load cells.

14. The weighing system according to claim 2, wherein the load cells are analog load cells.

15. The weighing system according to claim 2, wherein the load cells are arranged in at least one of a rectangular arrangement, or a triangular arrangements.

16. The weighing system according to claim 2, comprising:
a terminal display for outputting a weighing result.

17. The weighing system according to claim 2, comprising:
a CAN bus for transferring a digital load cell output to a weighing control and display module.

18. The weighing system according to claim 17, comprising:
a human computer interactive module for controlling the weighing system.

* * * * *

UNITED STATES PATENT AND TRADEMARK OFFICE
CERTIFICATE OF CORRECTION

PATENT NO. : 9,970,810 B2
APPLICATION NO. : 14/729284
DATED : May 15, 2018
INVENTOR(S) : Guojun Xie et al.

Page 1 of 1

It is certified that error appears in the above-identified patent and that said Letters Patent is hereby corrected as shown below:

In Column 15, Line 15, "$k_1$, $k_2$, $k_3$ are linear estimation coefficients" should read -- $k_1$, $k_2$, ... $k_m$ are linear estimation coefficients --.

In Column 18, Line 9, "$q_{11}(n)$, $q_{12}(n)$, ... $q_{max}(n)$" should read -- $q_{11}(n)$, $q_{12}(n)$, ... $q_{mm}(n)$ --.

In Column 19, Line 29, "m are linear estimation coefficients;" should read -- $k_1$, $k_2$, ... $k_m$ are linear estimation coefficients --.

In Column 19, Line 30, "$q_{11}(n)$, $q_{12}(n)$, ... $q_{max}(n)$" should read -- $q_{11}(n)$, $q_{12}(n)$, ... $q_{mm}(n)$ --.

In Column 20, Line 11, "is a total number" should read -- m* is a total number --.

Signed and Sealed this
Eighteenth Day of September, 2018

Andrei Iancu
*Director of the United States Patent and Trademark Office*